US011138986B2

(12) United States Patent
Berger

(10) Patent No.: US 11,138,986 B2
(45) Date of Patent: Oct. 5, 2021

(54) FILTERING OF A SOUND SIGNAL ACQUIRED BY A VOICE RECOGNITION SYSTEM

(71) Applicant: SAGEMCOM BROADBAND SAS, Rueil Malmaison (FR)

(72) Inventor: Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 132 days.

(21) Appl. No.: 16/576,132

(22) Filed: Sep. 19, 2019

(65) Prior Publication Data
US 2020/0098383 A1 Mar. 26, 2020

(30) Foreign Application Priority Data
Sep. 20, 2018 (FR) ...................................... 1858536

(51) Int. Cl.
*G10L 21/0232* (2013.01)
*G10L 15/22* (2006.01)

(52) U.S. Cl.
CPC .......... *G10L 21/0232* (2013.01); *G10L 15/22* (2013.01); *G10L 2015/223* (2013.01)

(58) Field of Classification Search
CPC ......... G10L 15/20; G10L 15/22; G10L 25/84; G10L 2015/223; G10L 21/0232; G06F 3/165
See application file for complete search history.

(56) References Cited

U.S. PATENT DOCUMENTS

| 8,983,833 | B2* | 3/2015 | Joshi | G10L 21/02 |
| | | | | 704/226 |
| 9,640,179 | B1* | 5/2017 | Hart | G10L 15/20 |
| 9,794,710 | B1* | 10/2017 | Sheen | G06F 3/162 |
| 2009/0222264 | A1* | 9/2009 | Pilati | G10L 19/0204 |
| | | | | 704/233 |
| 2017/0213550 | A1* | 7/2017 | Ali | G10L 21/0224 |
| 2017/0229137 | A1* | 8/2017 | Osako | G10L 25/84 |
| 2018/0165055 | A1* | 6/2018 | Yu | H04L 65/60 |
| 2020/0074995 | A1* | 3/2020 | Rosenberg | G10K 11/17837 |
| 2020/0135224 | A1* | 4/2020 | Bromand | H04M 9/08 |

(Continued)

FOREIGN PATENT DOCUMENTS

| WO | WO-2016135741 A1 * | 9/2016 | ......... G10L 21/0264 |
| WO | WO 2017/218386 A1 | 12/2017 | |

OTHER PUBLICATIONS

Cohen, I., "Noise Spectrum Estimation in Adverse Environments: Improved Minima Controlled Recursive Averaging," IEEE Transactions on Speech and Audio Processing, vol. 11, No. 5, Sep. 2003, pp. 466-475.

(Continued)

*Primary Examiner* — Mohammad K Islam
(74) *Attorney, Agent, or Firm* — Pilisbury Winthrop Shaw Pittman LLP

(57) ABSTRACT

A method for filtering a sound signal acquired by a voice recognition system is proposed wherein the filter used to delete the unwanted sound signal is based on a noise model created from a history of preceding acquisitions of the sound signal. The method is based on the history for predicting the characteristics of the signal in the course of acquisition and relies on this prediction to establish the noise model used by the filtering function.

18 Claims, 2 Drawing Sheets

(56) References Cited

U.S. PATENT DOCUMENTS

2020/0357374 A1* 11/2020 Verweij ................... H04S 7/304
2020/0367006 A1* 11/2020 Beckhardt ................ H04R 1/26
2020/0374269 A1* 11/2020 Lidman ................... G10L 15/30
2020/0402490 A1* 12/2020 Duthaler ............. G10L 21/0208

OTHER PUBLICATIONS

Hendriks, R. C., et al., "Noise Tracking Using DFT Domain Subspace Decompositions," IEEE Transactions on Audio, Speech, and Language Processing, vol. 16, No. 3, Mar. 2008, pp. 541-553.

Li, X., et al., "Non-Stationary Noise Power Spectral Density Estimation Based on Regional Statistics," 2016 IEEE International Conference on Acoustics, Speech, and Signal Processing (ICASSP), Mar. 2016, pp. 181-185.

Odelowo, B. O., et al., "A Noise Prediction and Time-Domain Subtraction Approach to Deep Neural Network Based Speech Enhancement," 2017 $16^{th}$ IEEE International Conference on Machine Learning and Applications, Dec. 2017, pp. 372-377.

Ephraim, Y., et al., "Speech enhancement using a minimum mean-square error short-time spectral amplitude estimator," IEEE Transactions on Acoustics, Speech, and Signal Processing, vol. ASSP-32, No. 6, pp. 1109-1121, Dec. 1984.

Wolfe, P. J., et al., "Simple alternatives to the Ephraim and Malah suppression rule for speech enhancement," IEEE Workshop on Statistical Signal Processing, pp. 496-499, 2001.

\* cited by examiner

FILTERING OF A SOUND SIGNAL ACQUIRED BY A VOICE RECOGNITION SYSTEM

CROSS-REFERENCE TO RELATED APPLICATIONS

This application claims priority to French Patent Application No. 1858536, filed Sep. 20, 2018, the entire content of which is incorporated herein by reference in its entirety.

FIELD

The present invention pertains to the digital processing of a sound signal. It relates more specifically to a method for filtering a sound signal acquired by a voice recognition system.

The invention finds applications, in particular, in the field of voice recognition systems capable of detecting and interpreting a command uttered by a user.

BACKGROUND

The use of voice recognition systems is today very widespread. It notably makes it possible for users of a device that is equipped therewith to command it without resorting to a manual interface such as buttons, a keyboard, a touch screen or a remote control box. The user can thereby activate a functionality or a service of the device by voice, simply by uttering one or more word(s) defining a command or instruction, and which are recognised and interpreted by the system.

In particular, such a voice recognition system must, in the first instance, detect and recognise a key word, to next listen to and interpret the command uttered by the user following this key word. The user thus utters a key work specific to the system in question to "wake it up" before uttering suitable instructions to the device that make it possible to command it. For example, the key words: "Ok Google", "Siri" or "Alexa" are known respectively for devices proposed by Google®, Apple® and Amazon®.

A difficulty associated with such voice recognition systems stems from their ability to isolate a key word and/or a command in an indeterminate sound ambiance, assimilable to noise. For example, if the user is in the course of listening to music at the same time as he utters the key word or if his environment generates a background noise which is itself also captured by the voice recognition system. Finally, in order to be able to offer a good performance level in its ability to recognise a word or a series of words, a voice recognition system must be capable of extracting this or these words independently of the sound environment (i.e. the ambient sound) in which it is (are) uttered.

Several approaches already exist for trying to reduce or to delete the noise components of a sound signal acquired by a voice recognition system. These approaches aim to make it possible to better discriminate the two components of the sound signal acquired by the system. On the one side, the wanted sound signal that has to be exploited by the system as an instruction voluntarily uttered by a user. On the other side, noise which is an unwanted sound signal that must not be exploited by the system and is even able to harm the performances thereof.

A first approach concerns voice recognition systems that are themselves the source of an ambient sound. For example, when the voice recognition system is integrated in a connected speaker which diffuses music in the ambient environment. In this case, the sound emitted by the speaker may be subtracted from the sound signal acquired by the system in order to only conserve sounds of origin external to the system and which are thus liable to contain vocal instructions of a user.

This approach is efficient but only works in the particular (and relatively restrictive) case where the system knows precisely the emitted sound that has to be processed as noise from the viewpoint of the voice recognition to carry out. And this is so whether it involves a sound generated by the device itself or a sound obtained directly from another system that generates it. In particular, the method does not work for an external audio source not having any direct connection with the voice recognition system. This is the case, for example, if a user is listening to music on a Hi-Fi chain independent of the device to command via the voice recognition system, for example a home automation installation, a television, a household electrical appliance, etc.

Another approach used to limit noise when the system is itself the source of ambient sound consists in reducing the volume, or even to stop the emission of this sound, as soon as the voice recognition system detects a key word. Thus, the associated sound perturbation no longer affects the voice recognition when the user next utters a command. This solution is for example used by the "Echo" and "Echo Dot" connected speakers sold by Amazon.

This solution only however applies if the voice recognition system can control the volume of the ambient sound, and especially it does not make it possible to improve the recognition of the key word itself since the volume of the ambient sound is only reduced after the detection and the recognition thereof.

Other noise reduction approaches, more sophisticated, are based on the use of a model defining the characteristics of the ambient noise, called noise model, in order to be able to reduce it the most efficiently possible. These approaches are thus all the more efficient when they are based on a noise model that is as correct as possible. Conventionally, these approaches are based on the use of two different types of models to establish the response of the filter.

On one side, parametric models, where the characteristics of the noise are given by a mathematical function dependent on a small number of parameters. Parameters such as the amplitude of the noise signal at a given acoustic frequency and the slope characterising the evolution of this amplitude as a function of frequency. This is known for example as "white" noise for a noise of which the slope is zero, "pink" noise for a noise of which the slope is 10 decibels per decade and "brown" noise for a noise of which the slope is 20 decibels per decade. Since the number of parameters is reduced, it is easy for the user to set the parameters of the model. It is also possible, within the limit of a small evolution, to learn these parameters in the course of the application of the response of the filter to the acquired sound signal.

On the other side, learned models, where the characteristics of the noise are obtained by analysing a signal time sequence assumed to only contain noise that is to say no wanted sound signal. These models are generally more precise than parametric models, but they require an intervention of the user who has to indicate to the system what sequence of the sound signal only comprises noise in order that the system can analyse it and extract therefrom the characteristics of the expected noise.

Whatever the model used, it is exploited by a specific filtering function to establish the response of a filter next applied to the acquired sound signal. Put another way, the noise model, described by a function $\lambda_d(k)$ that defines the average amplitude of the noise for each frequency of index k in the frequency spectrum considered for the sound signal, is used by the filtering function to determine the exact response of the filter.

The application of such a filter thus conventionally consists in the carrying out of a set of steps described below:
- cutting (or sequencing) the input signal into time sequences (also known as blocks) of a duration less than the duration of the acquired sound signal. Typically, time sequences of several milliseconds or of which the duration is determined by the number of samples contained in a sequence that the filtering function uses thereafter. For example, it is possible to use 4096 (that is to say $2^{12}$) samples.
- applying a Fourier transform to each of the sequences. In a manner well known to those skilled in the art, the Fourier transform transforms the signal from the temporal domain y(t) into a frequency signal $Y_k$ of amplitude $|Y_k|$ for each frequency of index k.
- calculating, for each frequency k, the response of the filter $H_k=C(Y_k)$, where C is a filtering function which depends on the noise model $\lambda_d(k)$.
- applying the filter to the signal by forming a product of the response of the filter by the signal and next applying an inverse Fourier transform to obtain a filtered signal such that:

$$\tilde{y}(t) = IFFT(H_k \times Y_k)$$

where IFFT designates Inverse Fast Fourier Transform.

Known noise filtering functions notably include so-called coring functions and the so-called Ephraim and Malah function. These functions are detailed hereafter.

Coring functions are those used when a noise reduction filter, designated coring filter, is applied to a given sound signal. Such a filter is based on the comparison of the level of the acquired sound signal and the expected level according to the noise model used by the function. If the level of the sound signal is substantially higher (above a threshold) than the expected noise level, then the signal is considered as only comprising little or no noise and is thus not or hardly filtered. Conversely, if the level of the acquired sound signal is substantially lower than the expected noise level, the signal is filtered.

All these functions have in common being increasing and such that $C(0)=0$ and $C(\infty)=1$, where the sign "$\infty$" designates the values at infinity. As an example, several known coring functions are listed below:

The threshold function is a function such that the signal is deleted (i.e. set to zero) for any amplitude of the signal to filter below a determined threshold $\tau$ (a given amplitude value) and conserved identically for any amplitude of the signal to filter above this threshold. In other words: $C(Y_k)=0$ if $|Y_k|$ is less than or equal to $\tau$ and $C(Y_k)=1$ otherwise:

$$C(Y_k) = \begin{cases} 0 & \text{if } |Y_k| \leq \tau \\ 1 & \text{if } |Y_k| > \tau \end{cases}$$

The attenuation function is a function such that the signal is decreased by a constant value $\tau$ for any amplitude of the signal to filter above a determined threshold $\tau$. In other words: $C(Y_k)=0$ if $|Y_k|$ is less than or equal to $\tau$ and $C(Y_k)=(|Y_k|-\tau)/|Y_k|$ otherwise:

$$C(Y_k) = \begin{cases} 0 & \text{if } |Y_k| \leq \tau \\ \dfrac{|Y_k|-\tau}{|Y_k|} & \text{if } |Y_k| > \tau \end{cases}$$

The soft threshold function is a threshold function modified so as not to create a discontinuity in the function at the level of the threshold value. It may be described by the formula:

$$C(Y_k) = 1 - e^{-\left(\frac{|Y_k|}{\tau}\right)^2}$$

The soft attenuation function evolves in a manner similar to the standard attenuation function for signals of high amplitude but has a softer evolution for values of low amplitude. It may be described by the following formula:

$$C(Y_k) = \frac{|Y_k|}{|Y_k|+\tau}$$

Coring functions thus all depend on a threshold $\tau$ of which the determination itself stems from the noise model $\lambda_d(k)$ used by the function concerned. For example, the threshold $\tau$ may be equal to $\lambda_d(k)$.

The Ephraim and Malah function is that used when a so-called Ephraim and Malah noise reduction filter is applied to a given sound signal. The Ephraim and Malah filter is a modelled noise reduction filter described in the article "*Speech enhancement using a minimum mean-square error short-time spectral amplitude estimator*", Y. Ephraim and D. Malah, IEEE Transactions on Acoustics, Speech, and Signal Processing, vol. ASSP-32, no. 6, pp. 1109-1121, December 1984.

This filter assumes knowing a noise model $\lambda_d(k)$ and, additionally, a model of the signal $\lambda_x(k)$ which defines the average amplitude of the wanted sound signal for each frequency of index k. The steps carried out during the application of such a filter are identical to those carried out for a coring filter. The only difference resides in the manner in which the response of the filter $H_k$ is calculated, in other words, in the filtering function used. Indeed, in the case of the Ephraim and Malah filter, the response of the filter $H_k$ is described by the formula:

$$H_k = \frac{\sqrt{\pi v_k}}{2\gamma_k}\left[(1+v_k)I_0\left(\frac{v_k}{2}\right) + v_k I_1\left(\frac{v_k}{2}\right)\right]e^{-\frac{v_k}{2}}$$

where:

$$v_k = \frac{\xi_k}{1+\xi_k}\gamma_k; \xi_k = \frac{\lambda_x(k)}{\lambda_d(k)}; \gamma_k = \frac{|Y_k|^2}{\lambda_d(k)};$$

and, where $I_0$ and $I_1$ are modified Bessel functions of order 0 and 1, respectively.

It is furthermore known that a simpler approximation of this formula, described in the article "*Simple alternatives to the Ephraim and Malah suppression rule for speech enhancement*", P. J. Wolfe and S. J. Godsill, IEEE Workshop on Statistical Signal Processing, pp. 496-499, 2001, may also be used to calculate the response of such a filter.

In all cases, apart from the difficulties linked to the establishment of a relevant noise model, these solutions used to filter noise are generally limited to the treatment of so-called stationary noises, that is to say noises of which the characteristics do not evolve over time. These solutions are thus well suited for reducing noise linked to a hiss effect or a relatively constant background noise such as that generated by a crowd. On the other hand, they are unsuitable for cases where the ambient sound evolves dynamically during acquisitions made by the voice recognition system.

SUMMARY

Various aspects of the invention aims to eliminate, or at least to attenuate, all or part of the aforesaid drawbacks of the prior art by proposing a method for filtering similar to that used by a coring filter or by an Ephraim and Malah filter, to which is added a step of learning of the noise model from a history of preceding acquisitions of the sound signal made by the voice recognition system.

To this end, a first aspect of the invention proposes a method for filtering, by a voice recognition system, a sound signal of amplitude y(t) as a function of time t, of which sequences of M samples are processed successively, where M is a determined strictly positive whole number, the filtering being carried out in the frequency domain with a given digital response filter $H_k$ which uses a function of a noise model $\lambda_d(k)$ modelling an ambient noise acquired in the sound signal with the voice to recognise, the noise model $\lambda_d(k)$ giving the average amplitude of the ambient noise for each considered frequency of index k, the method further including:

the keeping up to date of a history of N values $Y_k$ of the sound signal in the frequency domain, for N blocks of already processed respective samples of the sound signal, where N is a determined strictly positive whole number, and for each considered frequency of index k; and, the keeping up to date, at each processing of a block of samples of the sound signal and with a predictor using the history of the values $Y_k$ of the sound signal in the frequency domain, of the noise model $\lambda_d(k)$ so as to minimise the difference between the noise model $\lambda_d(k)$ and the amplitude $|Y_k|$ of the sound signal in the frequency domain.

Beneficially, an aspect of the invention makes it possible to use the history of past values of the sound signal (stored in the form of digital values converted in the frequency domain) for predicting the characteristics of the signal in the course of acquisition and relies on this prediction for establishing the noise model used by the filtering function. The filter response calculated by the filtering function using this model is next applied to the acquired sound signal, such that the sound signal thereby filtered only conserves the components useful to the voice recognition system to recognise a potential instruction. Indeed, the output signal only conserves the new characteristics of the input signal, such as for example the voice of the user who utters a key word, and removes the foreseeable characteristics, such as for example music present as background noise in the acquired sound signal.

In an alternative or as a complement:

the filtering of the sound signal includes:

the initialisation of all the elements of a set of N unidimensional tables $O_k(i)$ each including a determined number of elements, where i is an index comprised between 0 and N−1 attributed to the N unidimensional tables $O_k(i)$, respectively, the initialisation of coefficients P, of a predictive filter forming the predictor of the noise model $\lambda_d(k)$, the acquisition, by the voice recognition system, of a sequence of M samples of the sound signal y(t) and the application of a Fourier transform to the sequence of M samples of the sound signal in such a way as to obtain a value $Y_k$ of the sound signal in the frequency domain for each considered frequency of index k;

then, for each considered frequency of index k:

the calculation of the function of the noise model $\lambda_d(k)$ by a predictor using the unidimensional tables $O_k(i)$ weighted by the coefficients P; then, the updating of the value of the coefficients P of the predictor, according to a calculation method suitable for minimising the difference between the noise model $\lambda_d(k)$ and the value $Y_k$ of the sound signal in the frequency domain; and the updating of the history of the N values of the sound signal with the value $Y_k$ of the sound signal in the frequency domain;

the calculation of a response function $H_k$ of a filter, according to the formula $H_k=C(Y_k)$ where C is a noise filtering function dependent on the noise model $\lambda_d(k)$;

the calculation of the product of the function $H_k$ with the frequency signal $Y_k$;

and finally, the application of an inverse Fourier transform to the product in such a way as to obtain a signal, designated filtered signal, of amplitude ỹ(t) at each instant t.

the keeping up to date of the history of N values $Y_k$ of the sound signal in the frequency domain for each considered frequency of index k includes, at the step that is carried out successively at each processing of a respective block of samples of the sound signal and for each considered frequency of index k, the updating of the value of the elements of the unidimensional tables $O_k(i)$ in such a way that:

for any index i, starting from i=N−2 and so on while lowering the values of the index i up to i=0, $O_k(i+1)=O_k(i)$; then after, for the index i equal to zero, $O_k(0)=|Y_k|$.

a first mathematical distribution is used for the initialisation of the coefficients P of the predictive filter, such that P(i)=1/N, where i is an index comprised between 0 and N−1 attributed to each coefficient, and such that the sum of the coefficients P(i) for i comprised between 0 and N−1 is equal to one.

a second mathematical distribution is used for the initialisation of the coefficients P of the predictive filter, such that $P(i)=Z \times q^i$, where q is a value comprised between 0 and 1 and where $Z=(1-q)/(1-e)$, and such that the sum of the coefficients P(i) for i comprised between 0 and N−1 is equal to one.

the number M of samples in a time sequence is a power of 2.

the function $\lambda_d(k)$ of the noise model is obtained for each considered frequency of index k by application of the formula $\lambda_d(k)=\Sigma_{i=i_0}^{N-1} P(i) \times O_k(i)$, where $i_0$ is equal to zero.

the function $\lambda_d(k)$ of the noise model is obtained for each considered frequency of index k by application of the formula $\lambda_d(k)=\Sigma_{i=i_0}^{N-1} P(i) \times O_k(i)$, where $i_0$ is comprised between 1 and N−1.

the coefficients P defining the predictive filter of the noise model $\lambda_d(k)$ are frequency dependent coefficients $P_k$.

the function $\lambda_d(k)$ of the noise model is obtained for each considered frequency of index k, by a calculation method applying a neural network adapted to use the tables $O_k(i)$ as input and for generating at output the function $\lambda_d(k)$ by using and by updating the coefficients P of the neural network.

the neural network is suitable for only using the tables $O_k(i)$ for any i greater than a determined non-zero value.

the modification of the value of the coefficients P(i) is carried out according to a calculation method applying the formula:

$$P(i) = P(i) + \alpha \times \sum_k O_k(i)(|Y_k| - \lambda_d(k))$$

where $\alpha$ is a real number comprised between 0 and 1.

the updating of the value of the coefficients P is carried out according to a so-called gradient descent with momentum calculation method, or according to a so-called ADAM calculation method.

the updating of the N unidimensional tables $O_k(i)$ is carried out, in a memory of the voice recognition system, by use of a circular memory buffer.

the noise filtering function C is a so-called coring function, or a so-called Ephraim and Malah function.

In a second aspect, the invention relates to a voice recognition system including at least a calculation unit and a memory configured to implement all the steps of the method for filtering according to the first aspect.

In a third aspect, the invention relates to an electronic equipment including a device according to the second aspect.

In a fourth aspect, the invention relates to a computer programme including instructions which, when the computer programme is loaded in the memory of a computer and is executed by a processor of the computer, cause the implementation by the computer of all the steps of the method according to the first aspect.

In a fifth aspect, the invention relates to a tangible recording support, readable by a computer, on which is recorded in a non-transitory manner the programme according to the fourth aspect.

BRIEF DESCRIPTION OF THE DRAWINGS

Other characteristics and benefits of the invention will become clearer on reading the description that follows. This is purely illustrative and must be read with regard to the appended drawings in which.

DETAILED DESCRIPTION

Figure 1:
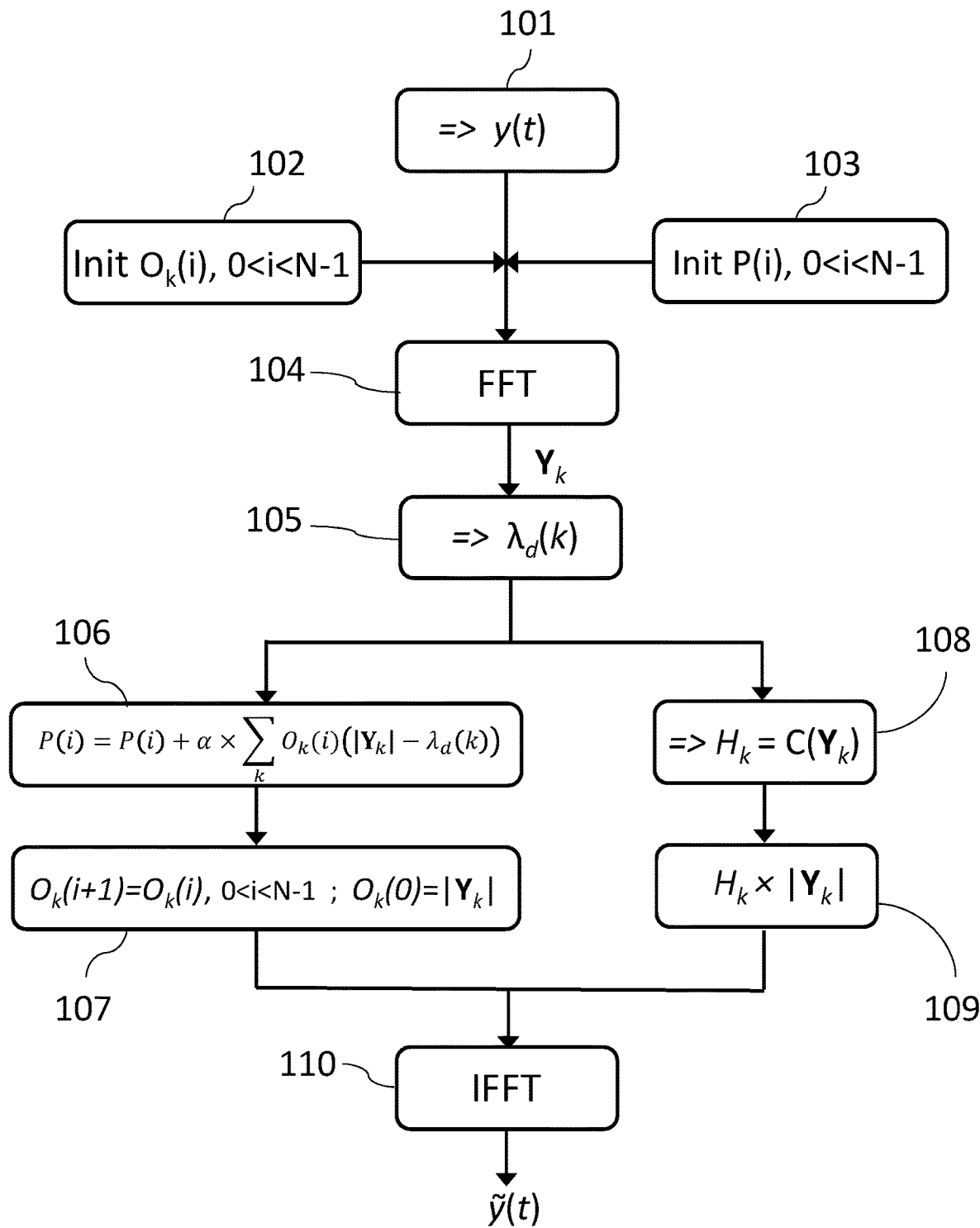
FIG. 1 is a diagram of steps illustrating embodiments of the method for filtering according to the invention.

In the description of embodiments that follows and in the Figures of the appended drawings, the same elements or similar elements bear the same numerical references in the drawings.

Unless otherwise specified, the following notations will be used in the description that follows and in the drawings:

y(t) is the value of the input signal at the instant t;

$Y_k$ is the value of the signal after Fourier transform for the frequency k;

N is the number of values conserved in the history, for example N=100, or instead N is chosen as a function of the sampling rate of the signal to correspond to a duration of 5 s, for example;

$O_k(i)$ represents the past values of $|Y_k|$ stored in the history;

P represents the coefficients of the predictive filter; in embodiments, these coefficients do not depend on the frequency k;

$\lambda_d(k)$ is the modelled amplitude for the noise at the frequency k;

$H_k$ designates the frequency response of the filter to apply to the signal; and, $\hat{y}(t)$ is the value of the output signal at the instant t.

With reference to the diagram of FIG. 1, an exemplary embodiment of the method for filtering according to embodiments of the invention is described. More specifically, FIG. 1 is a diagram of steps illustrating different steps carried out during the execution of the method.

It is firstly noted that this method may be implemented by any voice recognition system such as will be described hereafter with reference to FIG. 2. The method may thus, for example, be implemented in a connected speaker, a smartphone or an audio/video decoder when these items of equipment are with vocal command.

Step 101 of the method corresponds to the acquisition of a sound signal by the voice recognition system, of amplitude y(t) at each instant t. This step thus consists in acquiring a sequence or block of M consecutive samples of the signal y(t). In a purely exemplary example, each block includes 4096 samples of the signal y(t).

When the voice recognition system is active, this type of acquisition takes place in a continuous manner in order to be able to react as soon as a command/instruction is uttered by a user. The sound signal thereby acquired may include the voice of a user who utters a key word and/or a command to recognise, mixed with ambient noise. This ambient noise may correspond to a hiss effect linked to the apparatus itself or to a ventilation, or a hubbub such as can be heard in the presence of a crowd of people speaking at the same time, or instead background music (non-limiting list), or to all of these at the same time. The ambient noise may have, on average over time, a certain stationarity in frequency and in intensity compared to the key words and/or to the commands likely to be uttered by a user, but those skilled in the art will appreciate that the implementation of the method does not require making any hypothesis at this level.

Step 102 consists in initialising a set of N unidimensional tables $O_k(i)$, where N is a determined positive whole number, i is an index comprised between 0 and N−1 associated with each of the N tables, respectively, and where each table $O_k(i)$ includes a determined total number of elements. This number of elements is equal to the number of coefficients of the Fourier transform of a block, that is to say to half the number of samples in a block. The notion of block used here is identical to that described above with reference to the known prior art.

This initialisation includes for example the attribution of the value zero to all the elements of all the unidimensional tables $O_k(i)$, for i comprised between 0 and N−1. These tables thereby constitute a history of the values of the sound signal converted in the frequency domain and encoded in a digital manner. This history, which is initially empty, is filled and kept up to date as acquisitions of the sound signal are made. In an embodiment, only the N final values of the sound signal that have been acquired, also designated past values, are stored. In other words, this history is stored in a memory of the voice recognition system and is updated with new values after each new acquisition of a sound signal. As will be discussed hereafter, for each table $O_k(i)$ the index k corresponds to a given frequency of the useful spectrum of the sound signal.

According to an embodiment, during step 103, coefficients P, also called coefficients of the predictive filter, are initialised. For example, these coefficients are of number N and to each is attributed an index i corresponding to that of the tables $O_k(i)$. In addition, to each is also attributed a determined value according to a mathematical distribution such that the sum of these N values is equal to one. Such a distribution may be either a uniform distribution according to which, for example, $P(i)=1/N$ for all i comprised between 0 and N−1, or a so-called weighted distribution according to which, for example, $P(i)=Z \times q^i$ where q is a value comprised between 0 and 1 and where $Z=(1-q)/(1-e)$. It will be appreciated that, in both cases above, the sum of the coefficients P(i) for i comprised between 0 and N−1 is equal to 1.

In addition, those skilled in the art will appreciate that in this embodiment the coefficients P(i) only depend on the index i attributed to each table $O_k(i)$, that is to say that they do not depend on the frequency considered in the useful spectrum of the sound signal. This embodiment has the benefit of simplicity and thus of rapidity of the calculations to carry out. However, and as will also be discussed in greater detail hereafter, in a particular embodiment, the coefficients P(i) may be replaced by frequency dependent coefficients $P_k(i)$, with for benefit better filtering precision. In this case also, and this is so for each given frequency of index k, the sum of all the values attributed during the initialisation of the coefficients $P_k(i)$, for i comprised between 0 and N−1, is equal to 1.

Next, during step 104, a discrete Fourier transform is applied to each of these sequences in such a way as to obtain a frequency signal $Y_k$ of amplitude $|Y_k|$ for each frequency k. As those skilled in the art know, the Fourier transform (or transformation) is a mathematical analysis tool which associates with a function of which the variable is time a frequency dependent function. The discrete Fourier transform is a discontinuous variant of this method which makes it possible to obtain a discrete spectral representation of a digital signal sampled in a finite number of points.

The discrete Fourier transform of the sequence (or series) of M terms y(0), y(1), ..., y(M−1), is the series of M terms Y(0), Y(1), ..., Y(M−1) defined by:

$$Y(k) = Y_k = \sum_{m=0}^{M-1} y(m) \times e^{-j2\pi \frac{mk}{M}}$$

In practice, the M terms y(m) are M samples of the sampled analogue signal $y_m = y(m \times T_e)$, where $T_e$ designates the sampling period (generally 16, 22, 44, 48 or 96 kHz). And the M terms Y(k), which are noted $Y_k$ hereafter for convenience, correspond to an approximation (to more or less a multiplication factor $T_e$) of the Fourier transform of this signal at the M points of frequency $f_k = k \times f_e/N$, with k between 0 and M−1, that is to say f between 0 and $f_e$, where $f_e$ designates the sampling frequency ($f_e = 1/T_e$). Hereafter, "frequency of index k", or simply frequency k for convenience, designates the aforesaid points of frequency $f_k$.

In an exemplary embodiment, step 104 of the method can implement a Fast Fourier Transform (FFT), which is better suited to digital processing techniques implemented by software because it uses an efficient calculation algorithm.

In an embodiment of the method, the number M of samples may be, for example, a value equal to a whole power of 2, typically comprised between $2^8$ and $2^{16}$, for example 4096 samples as indicated above. In an embodiment of the method, this number may be adapted as a function of the sampling frequency to obtain sequences of a duration comprised between 1 and 10 milliseconds. These parameters may be optimised to reduce to the minimum the duration of the calculations and thus the speed of execution of the method.

Step 105 includes the calculation, for each frequency k, of a function $\lambda_d(k)$, designated noise model, by using the unidimensional tables $O_k(i)$ weighted by the coefficients P(i). This noise model thus stems directly from the history of preceding acquisitions made from the sound signal y(t).

In a particular embodiment, the first values of the history are not used. More specifically, a certain number of unidimensional tables $O_k(i)$ are not taken into account in the calculation of the noise model. This makes it possible to improve the response to the transitory signals by dismissing from the calculation that leads to the definition of the noise model the final values of the sound signal that have been acquired. In other words, the risk is thereby reduced that the start of a key work or command that is uttered by a user is not itself considered as noise for what relates to the recognition of the remainder and/or the end of what is uttered by the user, which would penalise the performance of this recognition.

Finally, in the first or in the second embodiment described above, the function $\lambda_d(k)$ may be obtained by performing the following calculation:

$$\lambda_d(k) = \sum_{i=i_0}^{N-1} P(i) \times O_k(i)$$

The difference uniquely arises from the fact that, in the first case, $i_0$ is zero (to take into account all the tables) whereas, in the second case, $i_0$ is non-zero with for example a value comprised between 1 and N−1 (to dismiss from the calculation all the tables of which the index is less than $i_0$). It will be appreciated that $i_0$ may, for example, be chosen as a function of the sampling rate to correspond to a duration slightly greater than the expected duration of a key word. Those skilled in the art will also appreciate that, in the second embodiment above, it is not necessary to calculate or store values of P(i) for $i < i_0$ since they are not used to calculate $\lambda_d(k)$.

As has already been said above, the calculation of the noise model $\lambda_d(k)$ may also use, in a particular embodiment, predictive filter coefficients that are dependent on the considered frequency of index k in the useful band of the sound signal. The noise model is then obtained by the following calculation:

$$\lambda_d(k) = \sum_{i=i_0}^{N-1} P_k(i) \times O_k(i)$$

Apart from the methods for calculating the noise model already mentioned, those skilled in the art will appreciate that other calculation methods may be used to generate a noise model $\lambda_d(k)$ from a history of preceding acquisitions. For example, a calculation method based on the use of a neural network may be preferred, using the tables $O_k(i)$ as inputs. Such a method does not require the use of predictive filter coefficients to weight the different tables $O_k(i)$ used in the calculation but uses instead coefficients of the neural network. Moreover, these coefficients are also updated in the course of learning of the neural network. Indeed, in a manner known per se by those skilled in the art, the neural network may be trained continuously by using the amplitudes $|Y_k|$ as examples of expected outputs for learning.

As for the other calculation methods, a single and same neural network may be used for all the considered frequencies of index k in the frequency spectrum of the sound signal or, conversely, several different neural networks may be used for each frequency of index k, respectively. Similarly, it is also possible not to use the first values of the history so as to be free of transitory phenomena.

Step 106 consists in modifying, for each index i, the value of the coefficients P(i), according to a calculation method suited to minimising the difference between the noise model $\lambda_d(k)$ and the frequency signal $Y_k$. Such a minimisation may be obtained, for example, by applying, for all i comprised between 0 and N−1, the following formula:

$$P(i) = P(i) + \alpha \times \sum_k O_k(i)(|Y_k| - \lambda_d(k))$$

where $\alpha$ is a real number comprised between 0 and 1 which determines a learning speed. This formula, used to update the coefficients of the predictive filter, corresponds to a so-called gradient descent minimisation formula, which aims to minimise the value $(|Y_k| - \lambda_d(k))^2$. Those skilled in the art will however appreciate that, during the minimisation of the overall difference between the noise model $\lambda_d(k)$ and the frequency signal $Y_k$, the difference may increase temporarily for certain frequencies k. Indeed, since the coefficients P are independent of the frequency, in certain circumstances it is impossible to lower all the differences at the same time and it may then be necessary to reduce the majority of the differences while slightly increasing some.

Furthermore, in the embodiment where the coefficients $P_k(i)$ depend on the frequency, this minimisation may be carried out according to the formula:

$$P_k(i) = P_k(i) + \alpha \times O_k(i)(|Y_k| - \lambda_d(k))$$

In addition, those skilled in the art will appreciate that other calculation methods suitable for minimising the difference between the noise model $\lambda_d(k)$ and the frequency signal $Y_k$ may also be used, in other embodiments of the method. In particular, the so-called "gradient descent with momentum" calculation method or the so-called "ADAM" calculation method.

The first of these methods consists in:
initialising a number N of values G(i), for i comprised between 0 and N−1, such that G(i)=0;
modifying, between the calculation of the noise model and the updating of the coefficients of the predictive filter (more generally the updating of the predictor of the noise model), the values G(i) according to the formula:

$$G(i) = \beta \times G(i) + (1 - \beta) \times \sum_k O_k(i)(|Y_k| - \lambda_d(k))$$

where $\beta$ is a coefficient comprised between 0 and 1, for example $\beta$=0.9; and,
updating the coefficients of the predictive filter according to the formula:

$$P(i) = P(i) + \alpha \times G(i)$$

The second of these methods is described in the article "*Adam: A Method for Stochastic Optimization*", D. P. Kingma and J. Lei Ba, ICLR, 2015.

During step 107, the value of the elements of the unidimensional tables $O_k(i)$ is modified, for each frequency k, such that:
for any index i, starting from i=N−2 and so on by lowering the values of index up to i=0: $O_k(i+1)=O_k(i)$; then after,
for the index i of zero value (i.e., for i=0): $O_k(i)=|Y_k|$.

In this way, the final value (converted in the frequency domain) of the acquired sound signal is integrated in the history in the table $O_k(0)$ of zero index and the other values already stored are conserved while being simply shifted from the table $O_k(i)$ of index i into the table $O_k(i+1)$ of index i+1, obviously up to concurrence of the N-th table of index N−1. In other words, the history is kept up to date with the N final acquired values stored in the N tables $O_k(0)$ to $O_k(N-1)$, of index 0 to N−1, respectively.

This updating of values stored in a memory of the voice recognition system may be carried out either by a physical shifting of the values attributed to the elements of the unidimensional tables $O_k(i)$, or by using a circular memory buffer such that the history may be updated without the values recorded in the memory having to be shifted physically. This thereby saves time and energy necessary for memory writing operations.

Step 108 consists in calculating, for each frequency of index k, a filter response function $H_k$ (or, simply, filter response $H_k$), according to the formula $H_k=C(Y_k)$, where C is a noise filtering function dependent on the noise model $\lambda_d(k)$. This filtering function may be, for example, a coring function or an Ephraim and Malah function such as those that have already been described in the introduction. These examples are in no way limiting, other functions being able to be considered as a function of the specificities specific to each application.

Step 109 consists in calculating the convolution product of the function $H_k$ with the frequency signal $Y_k$. This step corresponds to the concrete application of the response of the filter obtained thanks to the implementation of the method according to the invention to the acquired sound signal. Finally, this step also includes the application to the convoluted product of an Inverse Fast Fourier Transform (IFFT) to obtain the value of the sound signal filtered in the temporal domain.

The final step 110 of the method thereby corresponds to the delivery of the filtered sound signal of amplitude ŷ(t), at each instant t. This signal has thus been filtered by a filter based on a filtering function using a noise model established from a history of preceding acquisitions. In other words, the reactivity and the precision of the filtering are improved thanks to the implementation of the method.

Figure 2:
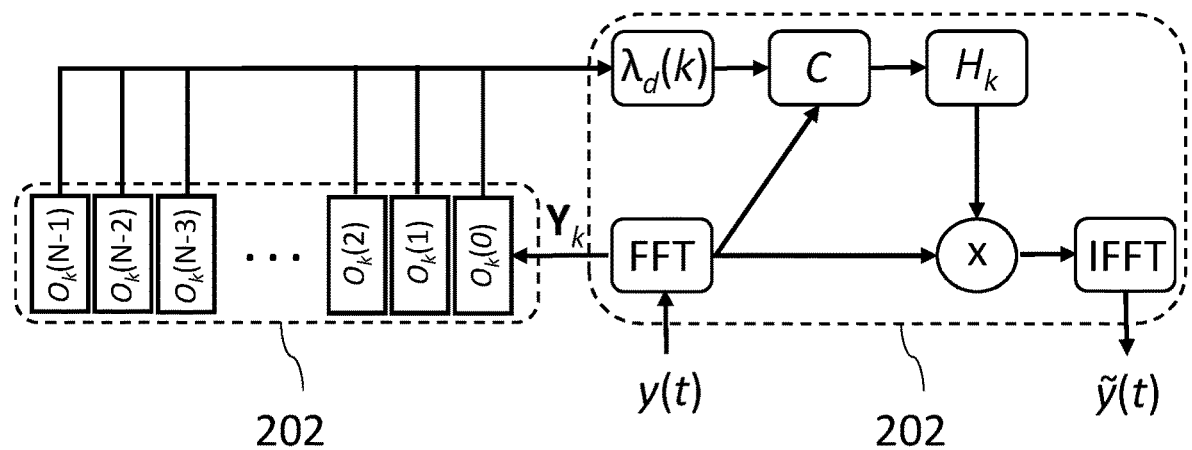
FIG. 2 is a functional diagram of a device including a system for implementing the method; and, FIG. 3 is a simplified diagram of an electronic product including a voice recognition system suitable for implementing the method for filtering according to an embodiment of the invention.
Figure 3:
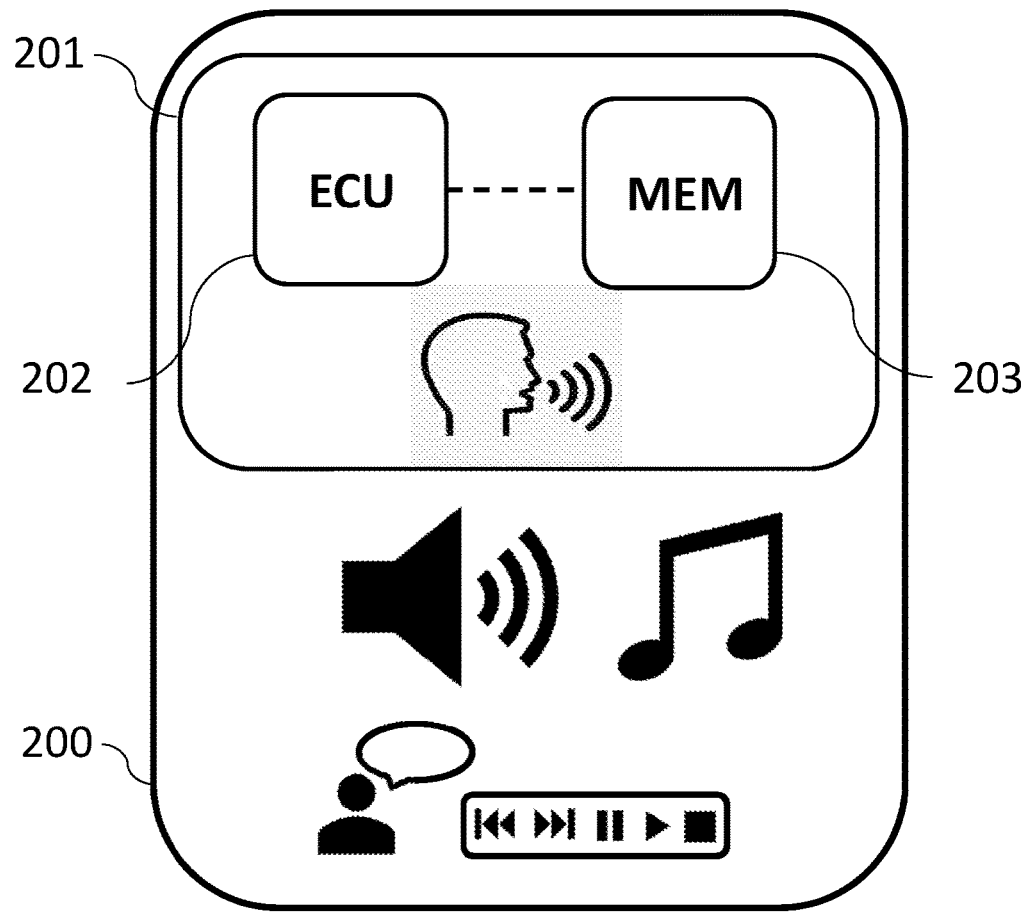

FIG. 2 is a functional diagram of a device including a system for the implementation of the method described above, and FIG. 3 schematically shows an example of electronic product 200 including a voice recognition system 201 in which the method described in the preceding may be implemented. This system 201 includes at least a calculation unit 202 and a non-transitory memory 203 which may be accessed for reading and for writing by the calculation unit, which can carry out all the steps of the method. The calculation unit includes one or more circuits (also broadly termed circuitry) for carrying out its functions. For example, all the values and tables created and modified in the course of the execution of the method are stored in the memory 203 and all the calculations performed on these values are performed by the calculation unit 202 of the system 201. The memory 203 or another separate memory may include machine executable instructions for performing the above different tasks, steps, functions and/or procedures. Alternatively, the machine executable instructions may be part of the calculation unit 202. The machine executable instructions are executed by the calculation unit 202.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for filtering, by a voice recognition system, a sound signal of amplitude y(t) as a function of time t, of which sequences of M samples are processed successively, where M is a determined strictly positive whole number, said filtering being carried out in the frequency domain with a given digital response filter $H_k$ which uses a function of a noise model $\lambda_d(k)$ modelling an ambient noise acquired in the sound signal with the voice to recognise, said noise model $\lambda_d(k)$ giving the average amplitude of the ambient noise for each considered frequency of index k, the method further including:

keeping up to date a history of N values $Y_k$ of the sound signal in the frequency domain, for N blocks of already processed respective samples of the sound signal, where N is a determined strictly positive whole number, and for each considered frequency of index k; and, keeping up to date, at each processing, a block of samples of the sound signal and with a predictor, using the history of values $Y_k$ of the sound signal in the frequency domain, of the noise model $\lambda_d(k)$ so as to minimise the difference between the noise model $\lambda_d(k)$ and the amplitude $|Y_k|$ of the sound signal in the frequency domain.

2. The method for filtering according to claim 1, wherein the filtering of the sound signal includes:
   a) initialising all the elements of a set of N unidimensional tables $O_k(i)$ each including a determined number of elements, where i is an index comprised between 0 and N-1 attributed to said N unidimensional tables $O_k(i)$, respectively,
   b) initialising coefficients P, of a predictive filter forming the predictor of the noise model $\lambda_d(k)$,
   c) acquiring, by the voice recognition system, a sequence of M samples of the sound signal y(t) and the application of a Fourier transform to said sequence of M samples of the sound signal in such a way as to obtain a value $Y_k$ of the sound signal in the frequency domain for each considered frequency of index k;
   then, for each considered frequency of index k:
   d) calculating the function of the noise model $\lambda_d(k)$ by a predictor using the unidimensional tables $O_k(i)$ weighted by the coefficients P; then,
   e) updating, the value of the coefficients P of the predictor, according to a calculation method suited to minimising the difference between the noise model $\lambda_d(k)$ and the value $Y_k$ of the sound signal in the frequency domain; and
   f) updating the history of the N values of the sound signal with the value $Y_k$ of the sound signal in the frequency domain;
   g) calculating a response function $H_k$ of a filter, according to the formula $H_k=C(Y_k)$ where C is a noise filtering function dependent on the noise model $\lambda_d(k)$;
   h) calculating the product of the function $H_k$ with the frequency signal $Y_k$; and finally,
   i) applying an inverse Fourier transform to said product in such a way as to obtain a signal, designated filtered signal, of amplitude $\tilde{y}(t)$ at each instant t.

3. The method for filtering according to claim 2, wherein the keeping up to date of the history of N values $Y_k$ of the sound signal in the frequency domain for each considered frequency of index k includes, at step f) which is carried out successively at each processing of a respective block of samples of the sound signal and for each considered frequency of index k, the updating of the value of the elements of the unidimensional tables $O_k(i)$ in such a way that:
   for any index i, starting from i=N-2 and so on while lowering the values of the index i up to i=0, $O_k(i+1)=O_k(i)$; then after,
   for the index i equal to zero, $O_k(0)=|Y_k|$.

4. The method for filtering according to claim 2, wherein a first mathematical distribution is used for the initialisation of the coefficients P of the predictive filter, such that $P(i)=1/N$, where i is an index comprised between 0 and N-1 attributed to each coefficient, and such that the sum of the coefficients P(i) for i comprised between 0 and N-1 is equal to one.

5. The method for filtering according to claim 2, wherein a second mathematical distribution is used for the initialisation of the coefficients P of the predictive filter, such that $P(i)=Z \times q^i$, where q is a value comprised between 0 and 1 and where $Z=(1-q)/(1-q^N)$, and such that the sum of the coefficients P(i) for i comprised between 0 and N-1 is equal to one.

6. The method for filtering according to claim 2, wherein the number M of samples in a time sequence is a power of 2.

7. The method for filtering according to claim 2, wherein the function $\lambda_d(k)$ of the noise model is obtained for each considered frequency of index k by application of the formula $\lambda_d(k)=\sum_{i=i_0}^{N-1} P(i) \times O_k(i)$, where $i_0$ is equal to zero.

8. The method for filtering according to claim 2, wherein the function $\lambda_d(k)$ of the noise model is obtained for each considered frequency of index k by application of the formula $\lambda_d(k)=\sum_{i=i_0}^{N-1} P(i) \times O_k(i)$, where $i_0$ is comprised between 1 and N-1.

9. The method for filtering according to claim 2, wherein the coefficients P defining the predictive filter of the noise model $\lambda_d(k)$ are frequency dependent coefficients $P_k$.

10. The method for filtering according to claim 2, wherein, instead of steps b), d) and e), the function $\lambda_d(k)$ of the noise model is obtained for each considered frequency of index k by a calculation method applying a neural network suitable for using the tables $O_k(i)$ as input and for generating at output the function $\lambda_d(k)$ by using and by updating the coefficients P of the neural network.

11. The method for filtering according to claim 10, wherein the neural network is suitable for only using the tables $O_k(i)$ for any i greater than a determined non-zero value.

12. The method for filtering according to claim 2, wherein, at step e), the modification of the value of the coefficients P(i) is carried out according to a calculation method applying the formula:

$$P(i) = P(i) + \alpha \times \sum_k O_k(i)(|Y_k| - \lambda_d(k))$$

where $\alpha$ is a real number comprised between 0 and 1.

13. The method for filtering according to claim 2, wherein, at step e), the updating of the value of the coefficients P is carried out according to a gradient descent with momentum calculation method, or according to an ADAM calculation method.

14. The method for filtering according to claim 2, wherein, at step f), the updating of the N unidimensional tables $O_k(i)$ is carried out, in a memory of the voice recognition system, by use of a circular memory buffer.

15. The method for filtering according to claim 2, wherein, during step g), the noise filtering function C is a coring function, or a Ephraim and Malah function.

16. A voice recognition system comprising a calculation unit and a memory configured to implement all the steps of the method for filtering according to claim 1.

17. An electronic equipment including a voice recognition system according to claim 16.

18. A non-transitory tangible computer storage medium comprising computer programme instructions which, when the computer programme instructions are executed by a processor of a computer, cause the implementation by the computer of all the steps of the method according to claim 1.

* * * * *